United States Patent Office 3,798,123
Patented Mar. 19, 1974

3,798,123
NUCLEAR FUEL FOR HIGH TEMPERATURE
GAS-COOLED REACTORS
Terrence B. Lindemer, Oak Ridge, Tenn., assignor to the
United States of America as represented by the United
States Atomic Energy Commission
Filed Mar. 16, 1972, Ser. No. 235,206
Int. Cl. G21c 3/06, 3/20
U.S. Cl. 176—67
8 Claims

ABSTRACT OF THE DISCLOSURE

A method of controlling fuel failure within a nuclear reactor by providing a novel fuel particle which maintains a total carbon monoxide and carbon dioxide partial pressure of less than $10^{(6.8-13,300/T^\circ K.)}$ atmospheres at temperatures above 1350° K.

BACKGROUND OF THE INVENTION

The invention described herein was made in the course of, or under, a contract with the U.S. Atomic Energy Commission.

This invention relates to a new composition of matter in the form of a new nuclear reactor fuel. This invention also relates to a method of controlling fuel failure within a nuclear reactor.

In the past, fuels for nuclear reactors, particularly high temperature gas-cooled reactors, have comprised, as sectionally depicted in FIG. 1, fissile uranium or plutonium as an oxide or carbide in the form of an approximately spherical kernel (1). The kernel may also be formed of a solid solution such as $(U,Pu)C_2$ or $(U,Pu)O_2$. This kernel sometimes is additionally comprised of a fertile material, e.g., $Th^{232}$ or $U^{238}$, which is in the same chemical form as the fissile material. The fuel kernel is also provided with several layers of protective coatings to contain fission products and to protect the fuel kernel. The kernel along with the coatings constitutes a fuel particle. Normally, these coatings will comprise a cover of porous carbon (2), a sealer layer of dense pyrolytic graphite (3), a layer of silicon carbide (4), and a final layer of dense pyrolytic graphite (5). The inner or "buffer" layer of porous graphite (2) with about 10 to 70% porosity absorbs any expansion or swelling of the kernel itself and minimizes damage to the other layers due to fission fragment recoil from the kernel. The adjacent dense graphite layer (3) is applied to isolate the kernel and layer (2) from attack by deleterious gases, such as chlorine, used in depositing the silicon carbide layer (4). The silicon carbide layer (4) gives dimensional stability to the overall fuel particle and provides containment for metallic fission fragments. This layer may be omitted with experimental fuels, but is included in all present particles for practical nuclear reactor applications. The final dense pyrolytic graphite layer (5) gives dimensional stability to the overall particle. Layers (3), (4), and (5) serve as pressure vessels for containment of fission gas. The fuel particle is normally approximately spherical or spheroidal with a diameter of about 400 to 1200 microns. The layer of porous carbon (2) is about 25 to 50 microns in thickness. The kernel (1) is about 300 to 1000 microns in diameter. The sealer layer (3) is about 10 microns in thickness and the dense graphite (5) and silicon carbide (4) layers are normally about 50 to 150 microns in thickness, each depending on the particular particle design.

In a high temperature gas-cooled reactor, the fuel particles are bonded together in a graphite matrix in the form of fuel sticks. The fuel sticks are normally cylinders with a length of from one-half to 6 inches and a diameter of about one-half inch. The fuel sticks are loaded into holes in a hexagonal graphite block to form a fuel element. Additional holes in the graphite block serve as passages for a gas coolant and also as a means for introducing control rods into the fuel element.

In using the above-described reactor design, it has been found that the oxide fuels fail during severe operational conditions. The failure rate has been found to increase with both increasing temperature and with increasing burnup, calculated as fissions per initial metal atom (percent FIMA). The physical cause of this fuel failure has been found to be a thinning of the coatings at one side of the kernel. Sometimes the thinning of the coatings at one side of the kernel is accompanied by a thickening of the coatings at the opposite side of the kernel resulting in the migration of the kernel toward the thin side. The ultimate failure of the particle has been found to be caused by a combination of localized thinning of the coatings, fuel migration, and fission gas pressure buildup within the fuel particle. In some instances of fuel failure the kernel will migrate completely through the coatings, and in other instances a thinning of the coatings weakens the pressure vessel and allows the gas pressure to explode the fuel particle. In either event, the overall process that involves a thinning of the coatings and fuel migration, called the amoeba effect, is the principal cause of fuel failure. The overall result of fuel failure is the release of fission products into the gas coolant, the formation of hot spots in the fuel element, and degradation of adjacent particles by the released kernel.

SUMMARY OF THE INVENTION

It is thus an object of this invention to provide a method of preventing the above-described fuel failure.

It is a further object of this invention to provide a new fuel particle which will not fail because of thinning of the coatings and fuel migration.

These and other objects are accomplished by providing a fuel particle with a kernel which is a mixture of a fissile oxide and a metallic carbide in such proportions as to establish a thermodynamic equilibrium which will fix the total carbon dioxide and carbon monoxide partial pressure at a value of less than that required to cause significant thinning of the coatings and fuel migration while simultaneously maintaining such pressures at a value less than that required to rupture the pressure vessel.

DETAILED DESCRIPTION

Figure 1:
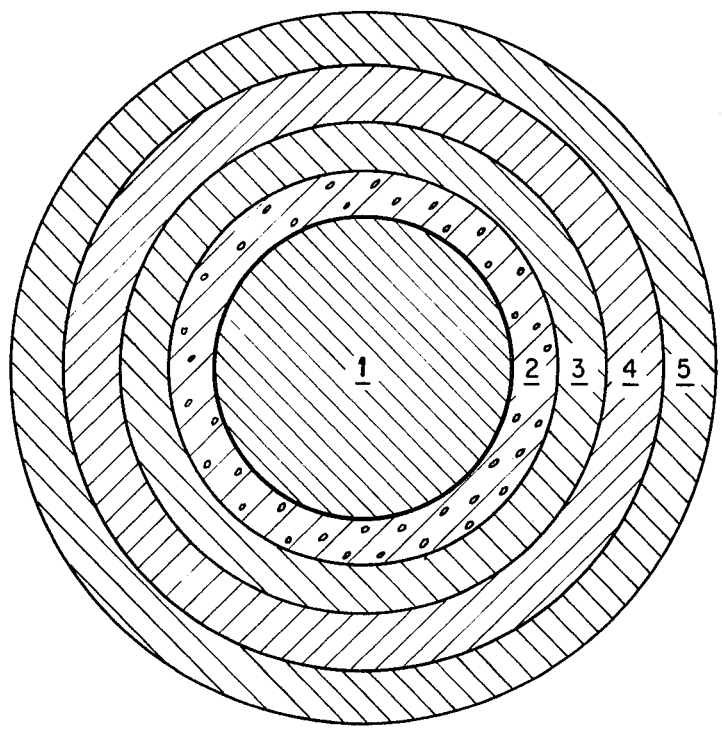
FIG. 1 is a sectional view of a fuel particle.

According to this invention, it has been discovered that the thinning of the coatings is proportional to the total carbon monoxide and carbon dioxide partial pressures within the fuel particle, the temperature difference across the particle and the percent burnup. The carbon monoxide and carbon dioxide gases are created by a reaction of oxygen, released from the fuel oxide as a consequence of nuclear burnup, with the carbon coatings. The total carbon monoxide and carbon dioxide pressure within a fuel particle is known to reach values as high as about 600 atmospheres at a temperature of 2250° Kelvin (1977° C.). While the original fuel particle will withstand such pressures, the thinning of the coatings causes the pressure vessels to weaken and thus fail.

A temperature difference across the fuel particle is an additional factor which enhances the thinning of the coatings, fuel migration and the eventual failure of the particle. This is caused by the temperature difference creating a difference in oxygen potential from one side of the kernel to the other. This difference in oxygen potential causes the $CO_2$ to be reduced by the carbon buffer layer at the hot side while the reverse reaction occurs at the cold side. The reaction at the hot side is $$CO_2 + C \rightarrow 2CO$$

and at the cold side $$2CO \rightarrow CO_2 + C$$

The net effect of these reactions is that carbon is removed from the hot side and deposited at the cold side. If the deposition at the cold side results in a thickening of the coating and not a densification of the porous buffer layer, the appearance is given that the fuel kernel is migrating toward the hot side. This phenomenon is known as fuel migration.

From the above, it is clear that it is necessary to have fuel burnup which releases oxygen from the fuel oxide coupled with a temperature gradient to cause carbon transport. Both of these conditions also must necessarily exist within a high temperature gas-cooled reactor.

Further according to this invention, it has been found that if the total carbon monoxide and carbon dioxide partial pressure is maintained below $10^{(6.8-13,300/T^\circ K.)}$ atmospheres at temperatures above 1350° K. carbon transport and coating thinning will be minimized to the extent that coating thinning will not be a significant cause of fuel failure. It has been further found that the total carbon monoxide and carbon dioxide partial pressure can be maintained within the temperature and pressure limits given above by establishing a thermodynamic equilibrium between carbon, a metal oxide, and a metal carbide within a fuel particle. Typical equilibrium reactions include the following:

$$MO_2 + 3C \rightleftarrows MC + 2CO, \quad (A)$$
$$MO_2 + 4C \rightleftarrows MC_2 + 2CO, \text{ and} \quad (B)$$
$$CO_2 + C \rightleftarrows 2CO \quad (C)$$

with the equilibrium constant for each reaction being $$k_A = \frac{a_{MC} P^2_{CO}}{a_{MO_2} a^3_C}$$

$$k_B = \frac{a_{MC_2} P^2_{CO}}{a_{MO_2} a^4_C}$$

$$k_C = \frac{P^2_{CO}}{a_C P_{CO_2}}$$

where:
M is a metal element,
$k_A$, $k_B$, and $k_C$ are, respectively, the equilibrium constants for reactions A, B, and C.
$a$ is the activity of the indicated subscript compound, and $P_{CO}$ and $P_{CO2}$ are, respectively, the partial pressures of carbon monoxide and carbon dioxide.

Since the activity of a condensed phase is essentially unity $$k_A \text{ and } k_B = P^2_{CO}$$

and $$k_C = \frac{P^2_{CO}}{P_{CO_2}}$$

It can be seen that by providing a suitable metal (M) to establish the above equilibria, a desired total pressure of carbon monoxide and carbon dioxide may be achieved. For the requirements of this invention the metal (M) in reactions A and B must have a carbide and oxide which have melting points above the operating temperature of the fuel particle, will provide a total carbon monoxide and carbon dioxide partial pressure of less than $10^{(6.8-13,300/T^\circ K.)}$ atmospheres at temperatures above 1350° K. in accordance with reactions A and B and does not act as a neutron poison. Metals which satisfy the above criterion include uranium, thorium, and plutonium. The optimum proposed operating temperature for a gas-cooled reactor is about 2000° C. The above metal oxides and carbides satisfy this operating temperature requirement.

Figure 2:
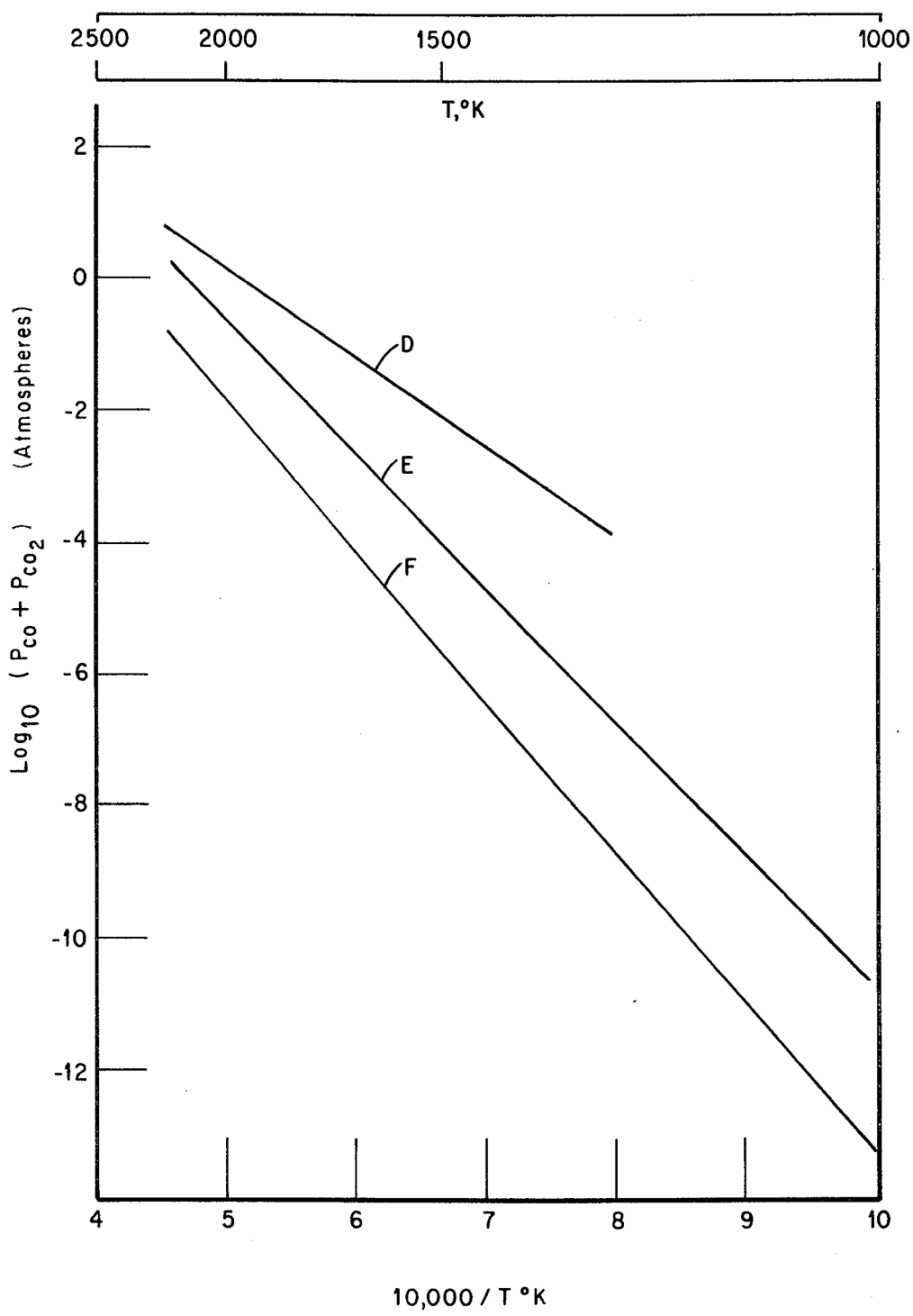
FIG. 2 is a log plot of the total carbon monoxide and carbon dioxide partial pressure as a function of reciprocal temperature achieved by this invention.

FIG. 2 of the drawings graphically illustrates the total partial pressure of carbon monoxide and carbon dioxide which must exist as a function of reciprocal temperature in order for fuel particle to have a reasonable operational lifetime. Line D of FIG. 2 represents the maximum permissible total carbon monoxide and carbon dioxide pressure within the operational temperatures of a gas-cooled reactor which can exist in order for the fuel to have an expected lifetime of 1000 to 4000 days. This broad range of lifetimes is given because the lifetime of a fuel will also depend on the level of operation (percent FIMA). Line D is represented by the equation $$P_{CO} + P_{CO2} = 10^{(6.8-13,300/T^\circ K.)}$$

where P is in atmospheres.

In order for the conditions of this invention to exist the equilibrium partial pressure of carbon monoxide and carbon dioxide established by the metal oxide, metal carbide and carbon system must have a total carbon monoxide and carbon dioxide partial pressure which falls below line D of FIG. 2. Line E represents the total carbon monoxide and carbon dioxide partial pressure established by the uranium oxide, uranium carbide and carbon system and by the plutonium oxide, plutonium carbide and carbon system. Line E is described by the equation $$(P_{CO} + P_{CO2}) = 10^{(9.35-20,000/T^\circ K.)}$$

Line F represents the equilibrium established by the thorium oxide, thorium carbide and carbon system and is described by the equation $$P_{CO} + P_{CO2} = 10^{(10.178-23,400/T^\circ K.)}$$

Both lines E and F are considerably below line D within the temperature range of interest making the above systems ideal for preventing thinning of coatings and fuel migration. It is understood that a certain amount of solid solution will form within each phase under operational conditions thus causing the exact chemical formula for each to deviate from the ideal chemical formulas given above. However, this deviation does not significantly effect equilibrium partial pressures of carbon monoxide and carbon dioxide.

It should be noted that the carbon required for the equilibrium reaction is provided by the porous carbon buffer layer, as well as the dense pyrolytic graphite layers. In the case of the above listed metals which are operable in the process and fuel kernels of this invention, fertile materials such as uranium-238 and thorium-232 may be mixed with the fissile oxide material of the kernel to serve the dual purpose of breeding a new fuel and establishing a thermodynamic equilibrium. In the case of using the thorium-232 isotope as a fertile material, a mixture of thorium oxide and thorium carbide is added to the fissile oxide part of the kernel. In the case of uranium-238, a mixture of uranium oxide and carbide is added to the fissile oxide of the fuel kernel to establish the thermodynamic equilibrium.

If either uranium oxide or plutonium oxide is used as the fissile material of the kernel, then only the corresponding carbide is added to the kernel to create the desired equilibrium.

It has been found that about 1 wt. percent of carbide needs to be added as a second phase to the oxide kernel for every 10% of anticipated FIMA for urania, every 5% FIMA of plutonia, and every 16% FIMA of the fissionable isotopes resulting from transmutation of thoria. This is necessitated by the fact that released oxygen forms additional CO which drives the reactions, A and B, back to the left thus consuming both the carbide and the CO, thus controlling the CO pressure at a given value. In systems where two or more fuel oxides are to be added to the fuel kernel, an amount of carbide roughly equal to the sum of the proportionate amounts of carbide required for each fissile oxide is required. In general, a total carbide content of from 0.1 to 20 wt. percent is effective to substantially prevent fuel migration.

The 20 wt. percent upper limit of carbide content is necessitated by the fact that the formation of a continuous carbide phase throughout the kernel must be avoided. If a continuous carbide phase is formed another fuel failure mechanism will come into operation thus defeating the purpose of this invention. The failure mechanism caused by the formation of a continuous carbide phase is more rapid than the mechanism described above for the thinning of the coatings.

Figure 3:
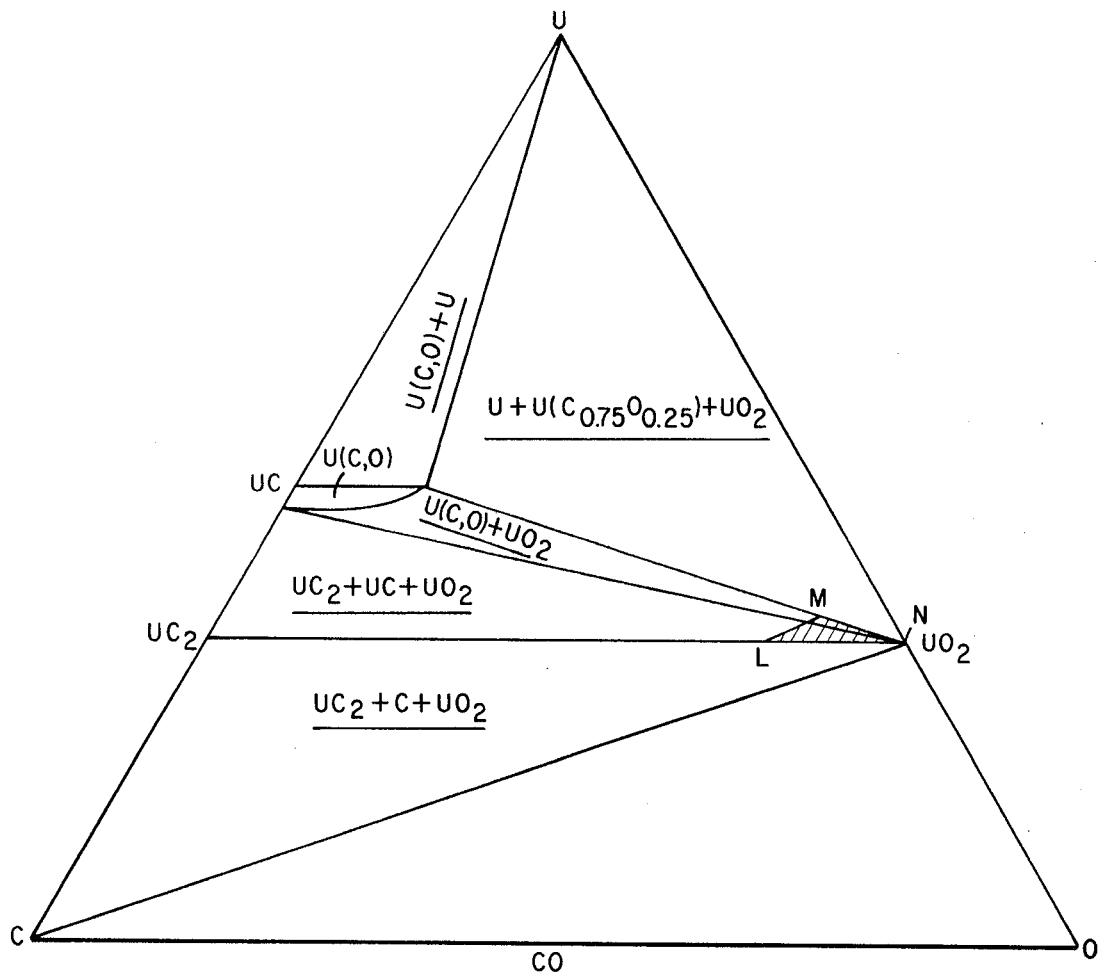
FIG. 3 is a uranium, carbon, oxygen phase diagram with proportions in mole percent.

The preferred embodiment of this invention comprises a fuel kernel of $UO_2$ with UC, $UC_2$ or U(C,O) added in an amount of from 0.1 to 20 wt. percent. U(C,O) is a solid solution of UC with up to 15 mole percent oxygen in solution. More exactly the composition of this invention is represented by the area enclosed by LMN in Fig. 3 of the drawings. This area encloses the limits of weight percent carbide specified above. When in contact with carbon the above mixture produces the following typical equilibrium reactions:

$$UO_2 + 4C \rightleftharpoons UC_2 + 2CO$$
$$UO_2 + 3C \rightleftharpoons UC_2 + CO_2$$
$$UO_2 + 3C \rightleftharpoons UC + 2CO$$

These reactions fix the total carbon monoxide and carbon dioxide partial pressures at the equilibrium values shown by line E of FIG. 2. It does not matter which isotope of uranium is added to the kernel to create the above equilibrium since the thermodynamics of the equilibrium process are independent of the isotopic makeup of the constituents. Either fertile $U^{238}$ or fissile $U^{235}$ may be used to create the equilibrium partial pressures of carbon monoxide and carbon dioxide.

The process disclosed in U.S. patent application Ser. No. 48,579, filed May 25, 1970, now abandoned and commonly assigned herewith is a perfectly suitable process for forming the fuel kernels of this invention. The fuel particle can then be completed by depositing pyrolytic graphite and silicon carbide on the fuel kernel. Also a conventional sol gel process can be modified to produce the fuel kernels by, for example, incorporating carbon into the sol prior to the sphere-forming process followed by carbon deposition to complete the fuel particle.

It has also been found that the particle size and distribution of the metallic carbides throughout the fuel kernel have very little effect on the establishment of an equilibrium. Fuel kernels must contain about 1 to 30% porosity so that equilibrium is easily established in spite of poor distribution.

The following specific examples are provided to exemplify various aspects of this invention and to demonstrate the comparable superiority of the process and product of this invention.

EXAMPLE I

Fabrication of microspheres of urania, urania-plutonia or urania-thoria, together with carbides of the same, is accomplished using the method described in U.S. Pat. No. 3,290,122 wherein only sufficient carbon is present to provide the final desired stoichiometric composition of carbide dispersed throughout the oxide.

The method of U.S. Pat. No. 3,367,881 may also be utilized together with the step of mixing finely-divided carbon to the sol prior to the formation of microspheres. This process involves:

(1) Preparation of the sol-gel;
(2) Addition of carbon;
(3) Formation of sol-gel microspheres;
(4) Heat treatment to remove organics and water; and
(5) Calcination in an inert atmosphere at 1600°–1900° C. to produce oxides with dispersed carbide via the reactions $$UO_2 + 2.5C \rightarrow UC_{0.75}O_{0.25} + 1.75CO$$

and/or $$UO_2 + 3C \rightarrow UC + 2CO$$

and/or $$UO_2 + 3.86C \rightarrow UC_{1.86} + 2CO$$

Usually enough carbon is actually present to give the desired final weight percent of carbide in the urana; however, should any residual free carbon remain in the kernel the result is not undesirable as long as sufficient carbon is present to form the desired weight percent carbide. The product composite microspheres are then given the necessary coatings of carbon and silicon carbide. The initial low-density, highly-porous carbon coating may be applied, for example, using the method disclosed in U.S. Pat. No. 3,472,677. A high density coating may then be applied using the method disclosed in U.S. Pat. No. 3,471,314. A SiC layer, if desired, may then be deposited in a fluidized bed with the SiC being derived by the thermal decomposition of, for example, methyl trichlorosilane. The outer carbon layer is produced by again using the method of U.S. Pat. No. 3,471,314.

EXAMPLE II

Figure 4:
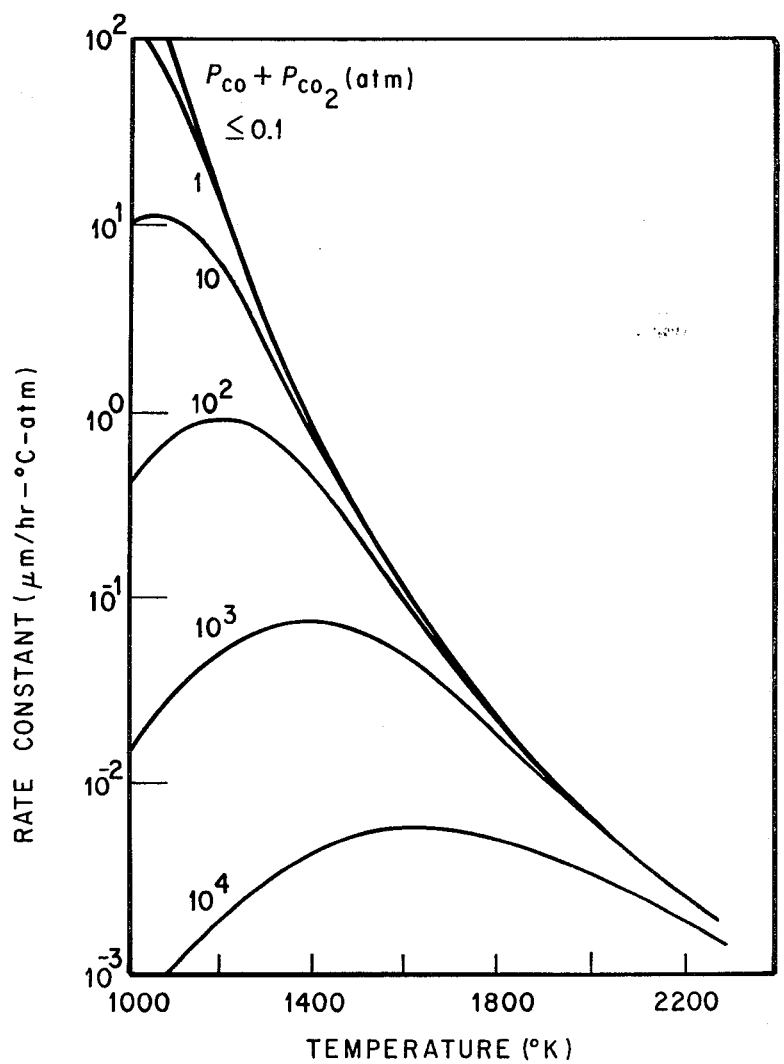
FIG. 4 shows the temperature dependence of a rate constant to be used in Example II.

According to this invention it has been found that fuel failure can be described by the following equation:

$$M = \frac{Gkt\Delta T(P_{CO} + P_{CO_2})\ln}{F(NRT/a\theta)}\left[1 + \frac{(NRT/a\theta)F}{P_{CO} + P_{CO_2} + 1}\right]$$

where:

a = ratio of the void space in the buffer to the volume of the kernel (usually 0.25).
F = percent FIMA (fissions per initial heavy-metal atom).
G = geometric factor, G ≤ 1.0, usually about 0.05.
M = thickness of carbon removed, μm., (usually set equal to the thickness of layer (5)).
N = number of moles of fission gas per mole of fuel per percent FIMA, usually about 0.002/% FIMA.
R = gas constant 82.06 atm.-cm.$^3$/mole °K.
k = rate constant for carbon transport via interdiffusion in the CO/$CO_2$ system, μm., of carbon/hr.,-° C.-atm. of CO+$CO_2$, given in FIG. 4.
T = average temperature, °K.
t = time at temperature, hrs.
ΔT = temperature difference across the fuel particle, °C.
θ = molar volume of the fuel about 24.6 cm.$^3$/mole.

Figure 5:
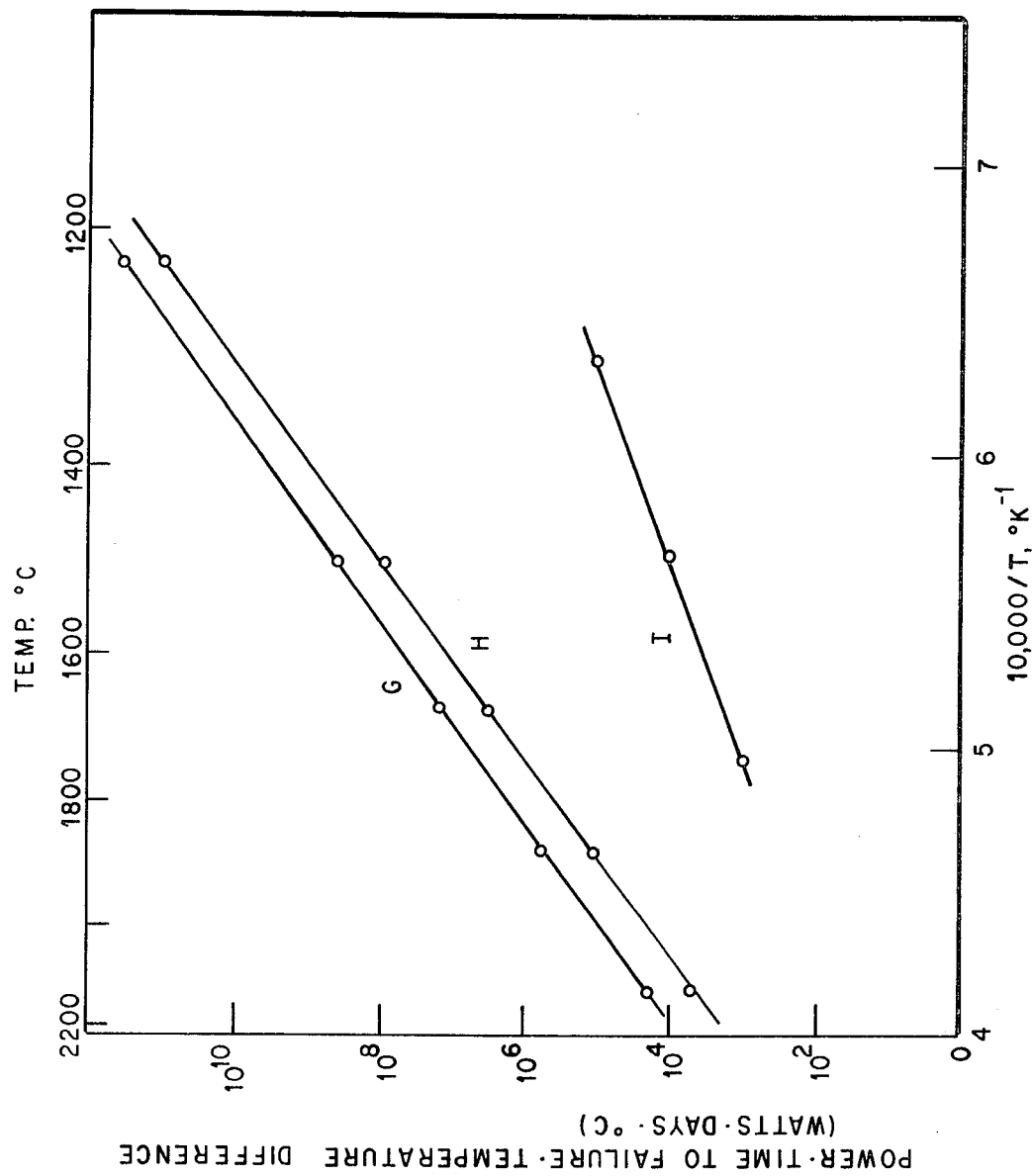
FIG. 5 graphically demonstrates the superior fuel life obtained by the use of this invention.

This equation has been used to calculate the time for coating failure under conditions of the present invention at the CO pressure for the typical reaction.

$$UO_2 + 3C \rightarrow UC + 2CO$$

at several temperatures and at 10 and 50% FIMA. A value of ΔT=100° was used in these calculations; the typical values of the other parameters are given above. For comparison with the empirical correlation of prior art practice, these results were used to calculate a parameter having the units (watts/particle) x time to failure x ΔT. The latter two of the three quantities in the parameter have been determined as described above, and since the percent FIMA is directly proportional to watt-hour/particle, the watts/particle is readily calculated. These comparisons are shown in FIG. 5. Line I represents the values from prior art reported practice in a plot having coordinate units identical to FIG. 5. Lines G and H represent a $UO_2$ fuel kernel of this invention with respectively 50% and 10% FIMA. It can be seen that under operating conditions of, for example, 1675° C. at a power output of 0.5 watt per particle and a 100° C. temperature difference across the particle that the prior art has an expected lifetime of about 40 days, while the fuel particle of this invention has an expected lifetime of 400,000 days and 100,000 days, respectively, at 10% and 50% FIMA. The extremely long lifetime predicted here results from the greatly reduced pressures of CO and $CO_2$ resulting from this invention and merely indicates that the particle coatings will not fail in the desired lifetime of the fuel, i.e., about 1000 to 4000 days.

EXAMPLE III

A comparison was made of the total carbon monoxide and carbon dioxide partial pressures existing within the equilibrium system of this invention and the pressures existing within the fuel particles of the prior art. The results are tabulated in the following table.

TABLE

| | CO + $CO_2$ pressures (atm.) | | | |
|---|---|---|---|---|
| | Prior art (urania kernels) | | $UO_2$-UC-$UC_2$ system, $PuO_2$-PuC, $PuC_2$ system | $ThO_2$-ThC, $ThC_2$ system |
| T., °C. | Minimum | Maximum | | |
| 1,000 | 0.7 | 25.7 | 3.0×10⁻⁴ | 1×10⁻⁷ |
| 1,400 | 1.4 | 100.0 | 0.004 | 0.0002 |
| 1,600 | 2.2 | 298.0 | 0.04 | 0.004 |
| 1,800 | 5.9 | 512.0 | 0.25 | 0.03 |
| 2,000 | 29.5 | | 2.0 | 0.5 |

It is readily apparent from the above table that the total carbon monoxide and carbon dioxide partial pressures are greatly improved by this invention. Also, referring to Example II, it is seen that the amount of carbon removed (M) is greatly reduced by reduction in the total carbon monoxide and carbon dioxide partial pressures.

As can be seen from the foregoing specification, the process of preventing oxide fuel failure as embodied in the improved fuel particle of this invention provides substantial increases in the time and quality of nuclear reactor operations. As is readily apparent, minor deviations from the described process and fuel particle of this invention may be made without departing from the spirit and scope of the appended claims. Such minor deviations may include providing the necessary constituents for the equilibrium reaction within the protective coatings of the fuel kernel instead of within the fuel kernel.

What is claimed is:

1. A spheroidal nuclear fuel particle comprising a central kernel of an oxide of a fissile metal and a metal carbide dispersed as a second phase within the said oxide, and a carbon covering adjacent said kernel, said metal carbide being effective to establish a thermodynamic equilibrium with said carbon of said cover and an oxide of said metal of said carbide that will maintain a total carbon monoxide and carbon dioxide partial pressure of less than $10^{(6.8-13,300/T° K)}$ atmospheres at temperatures above 1350° K.

2. The fuel particle of claim 1 wherein said oxide of a fissile metal is uranium oxide and said metal carbide is uranium carbide.

3. The fuel particle of claim 2 wherein said uranium oxide and said uranium carbide are in proportions within the area LMN of FIG. 3.

4. The fuel particle of claim 2 wherein said uranium carbide comprises from 0.1 to 20 wt. percent of said kernel.

5. The fuel particle of claim 1 wherein said metal carbide is selected from the group consisting of thorium carbide, uranium carbide, and plutonium carbide and said oxide of a fissile metal is selected from the group consisting of uranium oxide and plutonium oxide.

6. The fuel particle of claim 1 wherein said kernel is about 1 to 30% porous, said carbon cover is 10 to 70% porous and said particle additionally comprises a dense pyrolytic graphite coating adjacent said carbon cover.

7. The fuel particle of claim 6 additionally comprising a silicon carbide coating adjacent said pyrolytic graphite coating and another dense pyrolytic graphite coating adjacent said silicon carbide coating.

8. The fuel particle of claim 1 wherein said kernel comprises 0.1 to 20 wt. percent of said metal carbide.

References Cited

UNITED STATES PATENTS

| 3,650,896 | 3/1972 | Goeddel | 176—68 |
| 3,649,452 | 3/1972 | Chin et al. | 176—68 |
| 3,554,783 | 1/1971 | Beutler | 176—91 SP |
| 3,682,759 | 8/1972 | Beutler et al. | 176—91 SP |

LELAND A. SEBASTIAN, Primary Examiner

R. GAITHER, Assistant Examiner

U.S. Cl. X.R.

176—68, 91 SP; 264—0.5; 252—301.1 R